United States Patent [19]

McEwan

[11] Patent Number: 5,754,144
[45] Date of Patent: May 19, 1998

[54] ULTRA-WIDEBAND HORN ANTENNA WITH ABRUPT RADIATOR

[75] Inventor: Thomas E. McEwan, Livermore, Calif.

[73] Assignee: The Regents of the University of California, Oakland, Calif.

[21] Appl. No.: 684,110

[22] Filed: Jul. 19, 1996

[51] Int. Cl.⁶ .................................................. H01Q 13/02
[52] U.S. Cl. .................................................. 343/786
[58] Field of Search .......................... 343/786, 772, 343/789, 791; H01Q 13/00, 13/02, 13/06

[56] References Cited

U.S. PATENT DOCUMENTS

| | | | |
|---|---|---|---|
| 2,307,011 | 1/1943 | Barrow | 343/786 |
| 2,719,230 | 9/1955 | Smoll et al. | 343/786 |
| 3,274,602 | 9/1966 | Randall et al. | 343/786 |
| 3,757,345 | 9/1973 | Carver | 343/786 |
| 4,760,403 | 7/1988 | Grim | 343/786 |
| 5,440,316 | 8/1995 | Podgorski et al. | 343/786 |

*Primary Examiner*—Donald T. Hajec
*Assistant Examiner*—Tho Phan
*Attorney, Agent, or Firm*—Henry P. Sartorio

[57] ABSTRACT

An ultra-wideband horn antenna transmits and receives impulse waveforms for short-range radars and impulse time-of flight systems. The antenna reduces or eliminates various sources of close-in radar clutter, including pulse dispersion and ringing, sidelobe clutter, and feedline coupling into the antenna. Dispersion is minimized with an abrupt launch point radiator element; sidelobe and feedline coupling are minimized by recessing the radiator into a metallic horn. Low frequency cut-off associated with a horn is extended by configuring the radiator drive impedance to approach a short circuit at low frequencies. A tapered feed plate connects at one end to a feedline, and at the other end to a launcher plate which is mounted to an inside wall of the horn. The launcher plate and feed plate join at an abrupt edge which forms the single launch point of the antenna.

10 Claims, 4 Drawing Sheets

ULTRA-WIDEBAND HORN ANTENNA WITH ABRUPT RADIATOR

The United States Government has rights in this invention pursuant to Contract No. W-7405-ENG-48 between the United States Department of Energy and the University of California for the operation of Lawrence Livermore National Laboratory.

BACKGROUND OF THE INVENTION

Field of the Invention

THE invention relates generally to antennas and more particularly to ultra-wideband antennas designed to reduce or eliminate close-in clutter effects for use in short-range radars and impulse time-of-flight systems.

There exists a need for a better ultra-wideband (UWB) or impulse radar antenna, particularly for operation at ranges of less than 10 feet. At these short ranges, radar clutter, unwanted reflections, ringing, and pulse-like artifacts appearing in the radar return are very pronounced since they occur right after the large transmit pulse, or main bang. In conventional radar systems, like airport radars, the return pulse occurs many microseconds after the main bang, after close-in clutter has long passed and can thus be time-gated out. The primary sources of close-in clutter are: 1) pulse dispersion and ringing caused by the antenna, 2) antenna sidelobe clutter, and 3) feedline coupling directly to the antenna.

U.S. patent application Ser. Nos. 08/359,151 and 08/451,876 illustrate short range, micropower impulse radars with swept range gate. The transmit and receive antennas are contained in adjacent shielded cavities to reduce main bang coupling. Conductive or radiative (resistive) damping elements can be added to the cavities, or terminating plates can be attached to the cavity openings. U.S. Pat. No. 5,510,800 issued Apr. 23, 1996 shows an impulse radar time-of-flight system.

Transmitting and receiving a clean impulse places demands on an antenna that are not fulfilled by present-day antennas. Many antennas have excellent bandwidth as exhibited by their s-parameter magnitudes such as $|s_{11}|$ and $|s_{21}|$. Unfortunately, selecting a short range radar antenna based on these parameters alone practically guarantees an antenna that falls woefully short of what is needed to pass clean voltage impulses. Indeed, the present invention appears to be the only antenna that simultaneously provides clean impulse response, low sidelobe radiation, and low feedline coupling.

There are numerous antenna types that have a large $|s_{21}|$ bandwidth, but have a poor time domain response. One example is a log-periodic antenna, with more than a decade of bandwidth but with a chirped-frequency step response.

An impulse radar antenna must have broad bandwidth, like the log-periodic, and it must also have good phase behavior, or more precisely, constancy in group delay across the operating band. Group delay is the change in phase vs. frequency for an $s_{21}$ type measurement. A constant group delay means there is a constant delay in the path, and this constant is acceptable since it appears as a small range offset. If group delay changes across the band, the various frequency components in an applied pulse experience different amounts of delay as they pass through the antenna, and the radiated/received pulse waveform becomes dispersed.

For example, the present invention exhibits a group delay variation of about 300 picoseconds across the 1 to 6 GHz band. When the transmit antenna is driven with a sharp step-like pulse with <100 ps risetime, the receive antenna output is dispersed, and appears as a one cycle sinusoid, or double Gaussian pulse, spanning 300 ps at the baseline. This dispersion is undesirable since it degrades the range resolution of the radar. Nevertheless, it is representative of the best available UWB antennas.

A physical explanation of one type of dispersion can be understood with reference to FIGS. 1A, B, which depict the classic tapered-slot antenna, also known as the Vivaldi or bi-blade antenna, which is formed of a pair of tapered blades or jaws which define a tapered slot therebetween. A coaxial (coax) feed line is connected to the tapered slot line, which matches the feed line cable impedance, typically 50Ω, to the impedance of free space—the impedance at the open jaw end has been measured to be greater than 250Ω. The structure is inherently broadband, with a low frequency cutoff inversely related to the linear jaw aperture. Dispersion arises in this structure due to the tendency of the applied signal to radiate from different points within the jaw: high frequencies radiate, or launch, furthest within, at $L_{HF}$ in FIG. 1A, and low frequencies launch from the jaw opening region, at $L_{LF}$.

This frequency-dependent launch point leads to dispersion, since the propagation speed is different for the conducted low-frequency pulse components traveling to the mouth of the structure, relative to the free-space high frequency components launched within the jaw. The amount of dispersion in the taper-slot antenna is similar to the present invention for comparable apertures.

Although the taper-slot antenna has practically become symbolic of UWB impulse radar systems, it is actually a very poor impulse radar antenna, particularly at short ranges. The problems with the tapered slot antenna and other antennas of similar structure, such as the pyramidal horn, are 1) high side-lobe radiation and 2) very poor feedline isolation. That the tapered slot antenna has poor sidelobes ($S_L$) is obvious from FIG. 1A. The entire side of the antenna's radiator or blade is plainly visible, both to the naked eye and to any other antenna. To achieve low sidelobe radiation, the antenna's radiator generally needs to be shielded from view.

A metal horn can be placed around the bi-blade structure, turning it into a common ridged horn antenna. This greatly reduces sidelobes, but the horn structure acts as a dispersive low pass filter, creating a sharp low frequency cut-off and consequently, excessive ringing.

Feedline coupling ($C_c$) is a severe problem with the tapered-slot antenna. As can be seen in FIGS. 1A, B, the unshielded blades are in direct view of the feedline. The feedline usually carries low frequency components associated with the transmit pulse, and these components can leak through the coax shield and radiate to the receive antenna. Another coupling mode occurs when the coax shield is poorly grounded, such as through the sheet inductance of an instrument panel or some other ordinarily minor grounding deficiency. Poor coax grounding results in a "hot jacket" that directly conducts interference to the bi-blade antenna's ground side. Low frequency pulses on the ground side of the blade induce their mirror image on the center conductor side. This mirror image then flows down the coax center conductor to the receiver. These cable-induced components are usually low in frequency, perhaps 500 MHz in a 100 ps pulse width system. The magnitude of these components is often far larger than bona fide radar echoes only a few feet away. For this reason, one's first impression of a newly set-up impulse radar is usually negative: the real signal looks hopelessly lost in low frequency ringing and in sidelobe reflections from nearby equipment.

As evidenced in the UWB radar literature, these problems have generated considerable experimentation with pulse and spectrum shaping, RF filtering, and the development of exotic feedline-to-antenna UWB balun transformers—all to put a "Band-Aid" solution on UWB antenna problems.

SUMMARY OF THE INVENTION

Accordingly it is an object of the invention to provide improved ultra-wideband (UWB) antennas.

It is another object of the invention to provide UWB antennas designed to reduce or eliminate close-in clutter effects.

It is also an object of the invention to provide UWB antennas for use in short-range radars and impulse time-of-flight systems.

The invention is an ultra-wideband horn antenna that transmits and receives impulse waveforms for short-range radars and impulse time-of flight systems. The antenna reduces or eliminates various sources of radar clutter, including pulse dispersion and ringing, sidelobe clutter, and feedline coupling into the antenna. Antenna dispersion is minimized with an abrupt launch point radiator element, and sidelobe and feedline coupling are minimized by recessing the radiator into a metallic horn. A tapered feed plate connects at one end to a feedline, and at the other end to a launcher plate which is mounted to an inside wall of the horn. The launcher plate and feed plate join at an abrupt edge which forms the single launch point of the antenna.

DETAILED DESCRIPTION OF THE INVENTION

The present invention addresses the three above-mentioned UWB antenna problems as follows:

1) dispersion due to a frequency-dependent launch point is eliminated with a non-distributed radiator; in particular, a top-driven resistively-loaded monopole is employed that forms a localized, or abrupt radiator, 2) sidelobe radiation is substantially reduced by recessing the radiator within a metallic horn, 3) feedline coupling is essentially eliminated by recessing the radiator within a metallic horn, 4) the dispersive low frequency cut-off associated with a horn is extended by configuring the radiator drive impedance to approach a short circuit at low frequencies, thereby increasing low frequency drive current.

Figure 1A:
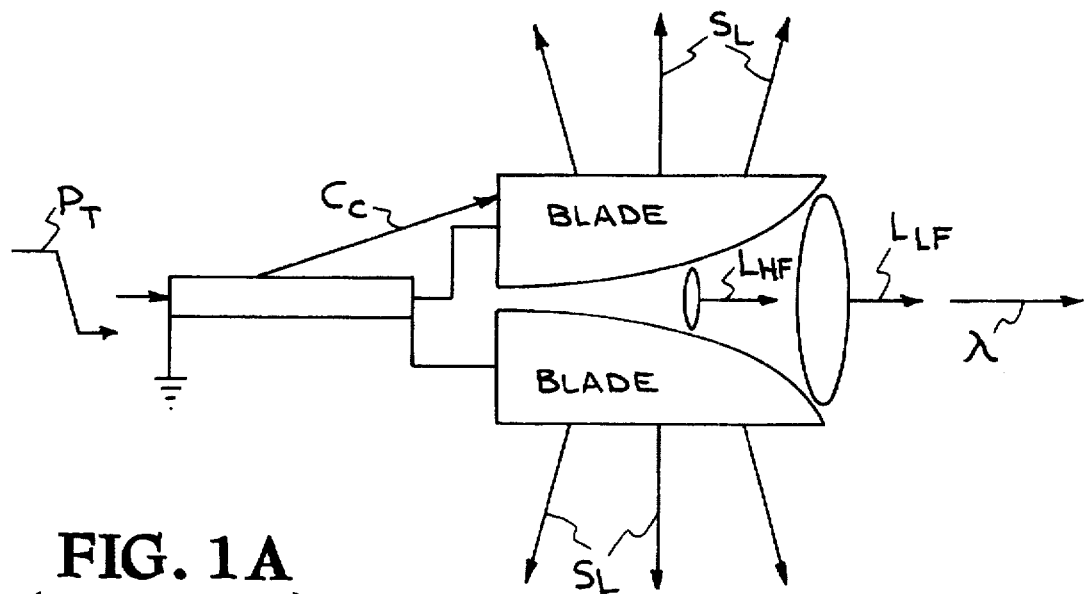
FIGS. 1A, B illustrate prior art tapered-slot transmit and receive antennas.
Figure 1B:
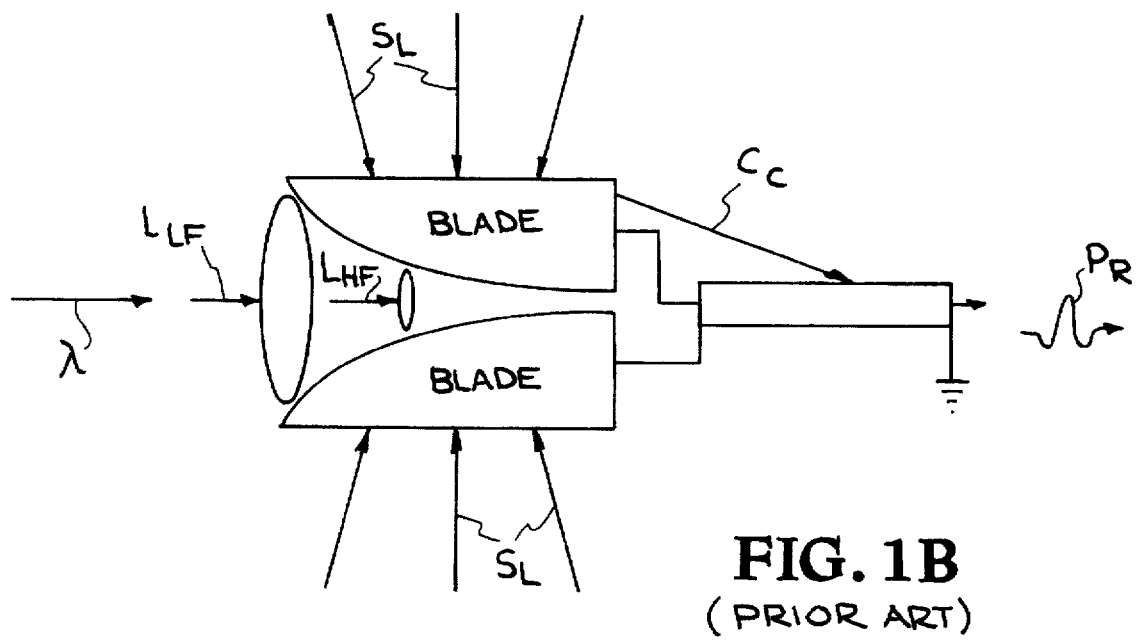
Figure 2A:
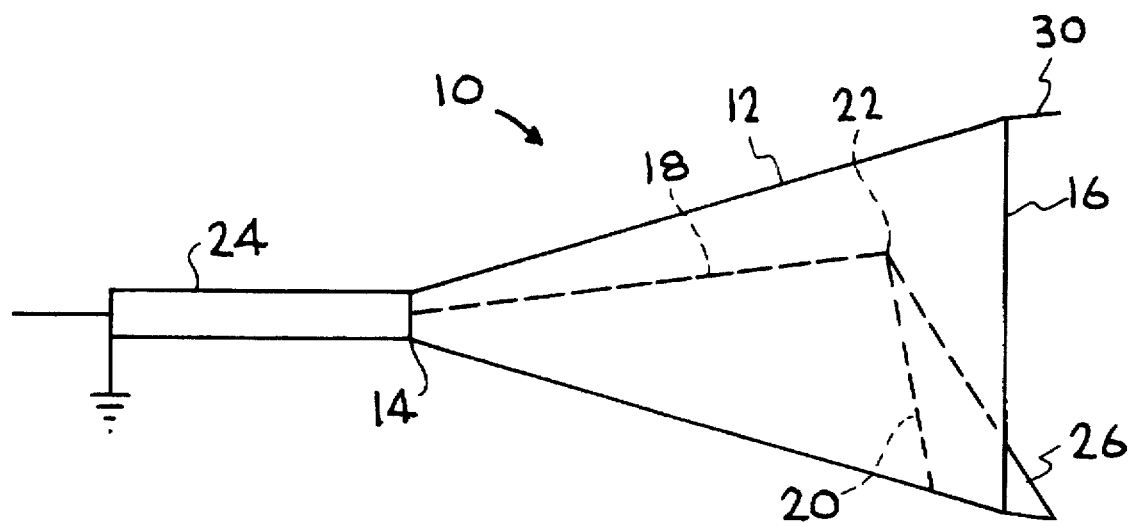
FIGS. 2A, B, C are side, aperture and perspective views of the ultra-wideband horn antenna of the invention.

FIGS. 2A, B, C depict various views of the new antenna. Antenna 10 is formed of a tapered metallic horn 12 which has a narrow feedline end 14 and a wider aperture end 16. Horn 12 is typically of rectangular cross-section, but may have other shapes. A tapered feed plate 18 is mounted in the horn 12, extending from the feedline end 14 towards but not all the way to the aperture end 16. A launcher plate 20 is mounted within horn 12, substantially facing the aperture end 16, with one edge connected to the end of the feed plate 18 near the aperture end 16 and an opposed edge connected to an interior wall of horn 12. Feed plate 18 and launcher plate 20 are joined at an abrupt edge 22, i.e. the angle between the launcher plate 20 and feed plate 18 is an abrupt angle, e.g. substantially a right angle. Thus launcher plate 20, which forms the radiator element of antenna 10, is recessed from aperture end 16 of horn 12. All radiation is emitted at abrupt edge 22.

The feedline 24 is preferably a coaxial cable (coax), typically 50Ω, that connects to the narrow end of feed plate 18 within the horn 12 through feedline end 14. The center conductor of (coax) feedline 24 is connected to feed plate 18 while the ground conductor is connected to the horn 12. The feed plate 18 is typically a constant impedance 50Ω tapered strip transmission line geometry that starts out narrow at the narrow end 14 of the horn and linearly tapers out to the width of the launcher plate 20. Feed plate 18 and launcher plate 20 can be fabricated from a single piece which is bent to form the desired abrupt junction edge. Horn 12 is made of metal or metallized plastic and forms a shielding cavity to reduce or eliminate sidelobes and feedline coupling.

The launcher plate can be viewed as a monopole driven from the top, or high impedance end, by the 50Ω feed plate. Since the monopole is top-loaded by the 50Ω feed plate, it does not have a common λ/4 bottom-driven monopole, i.e., it is broadband. To further broadband the launcher, an optional fin 26 can be used to tie the monopole to the horn body. Fin 26 is a triangular shaped metallic piece which is mounted perpendicular to launcher plate 20 along one edge and has a second edge attached to the interior wall of horn 12 where launcher plate 20 is attached.

Figure 2B:
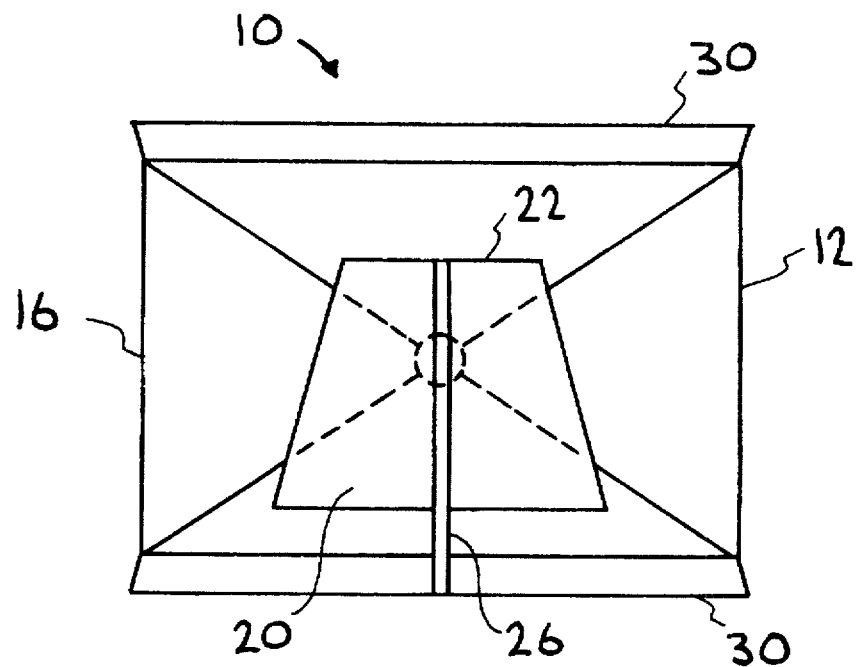
Figure 3:
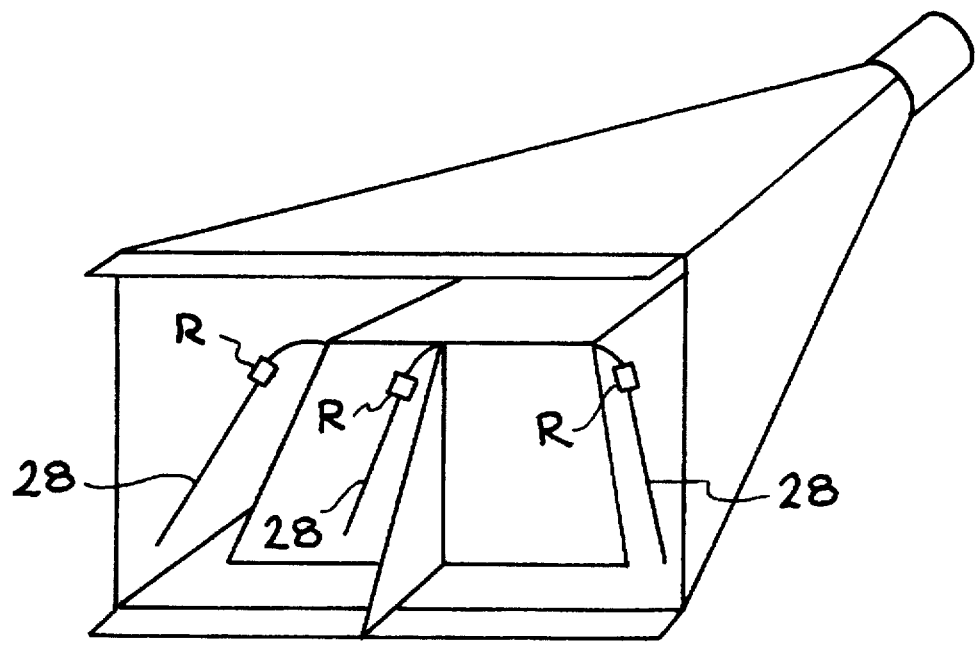
FIG. 3 is a perspective view of the ultra-wideband horn antenna of FIGS. 2A, B, C with the addition of damping elements.

Yet another broad-banding technique can be utilized with the UWB antenna 10, as shown in FIG. 3, by the addition of one or more optional resistive damping elements 28 to the monopole radiator element. One end of each element 28 is attached to the radiator. Here R=100Ω and the total length of each damping element is about λ/4 at the center frequency of the antenna, about 4 GHz for a 2×3 inch aperture horn (outer dimensions of aperture end 16 in FIG. 2B). Without the damping elements 28, there is about one cycle of ringing at 4 GHz trailing the main impulse.

Figure 2C:
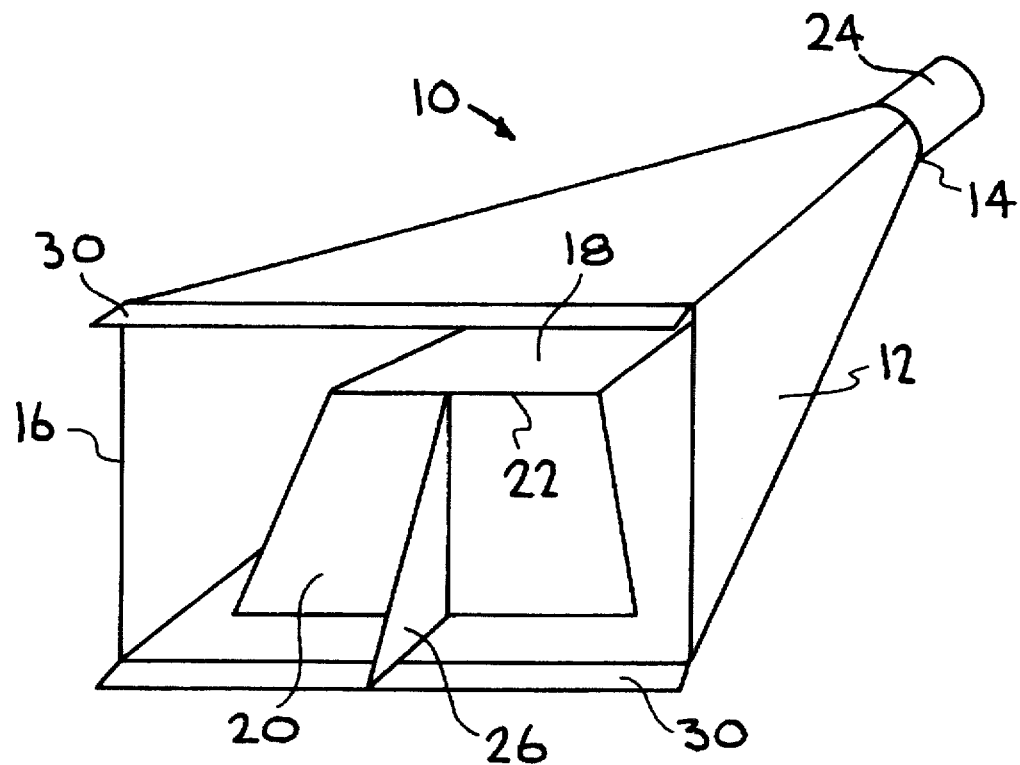

The optional lips 30 shown in FIGS. 2A–C, which extend from opposed edges of aperture end 16 of horn 12, help launch a clean pulse by controlling trailing pulse ringing due to horn rim effects. The lips have little to do with the radiator element, and everything to do with getting a clean wave launched from the metal/air discontinuity at the mouth of the horn.

The frequency domain performance of the antenna is given in the accompanying table. The gain and beamwidths are comparable to narrowband antennas of similar aperture (2×3 inches).

| HORN ANTENNA DATA | | |
|---|---|---|
| FREQUENCY | GAIN | BEAMWIDTH |
| 2.0 GHz | 5 dBi | — |
| 6.5 GHz | 14 dBi | 25° |

Figure 4:
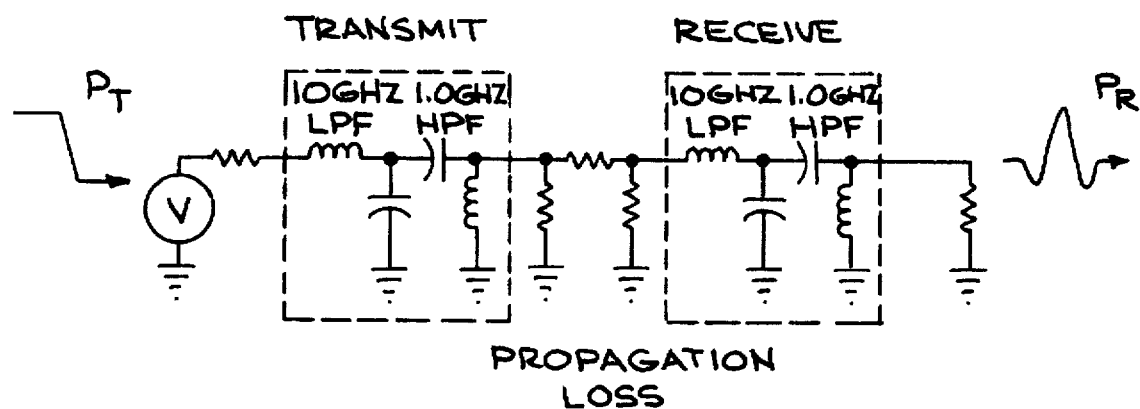
FIG. 4 is an equivalent circuit for a pair of antennas of the invention.

FIG. 4 provides an equivalent circuit that approximates the time domain response of the new antenna. The transmit (T) and receive (R) antennas are both modeled identically as cascaded second order highpass and lowpass Butterworth filters. Thus, the net transfer function of one antenna beaming directly into the other is that of a fourth-order highpass filter with a 1 GHz cut-off frequency, cascaded with a fourth-order lowpass filter with a 10 GHz cut-off frequency. SPICE simulations show the step response $P_R$ of this network when excited by a step-like pulse $P_T$ to be the classic "W" shaped pulse, or double Gaussian, which is effectively a 1.0 cycle sinusoid (¼ cycle preshoot, ½ cycle main pulse and ¼ cycle postshoot). SPICE simulations also show that virtually all the group delay variation is due to the 1 GHz highpass sections, i.e., the low frequency cut-off of the antenna. The high frequency cut-off value has little effect on total antenna dispersion; the high frequency cut-off has a 10× shorter time constant, and thus 10× less effect. Thus, the dispersed "W" shaped pulse $P_R$ is due to simple highpass filtering action and not due to a frequency-dependent launch point. The present antenna improves upon the ridged horn by only having one form of dispersion, highpass dispersion, and not both highpass and frequency-dependent launch point dispersion.

Figure 5:
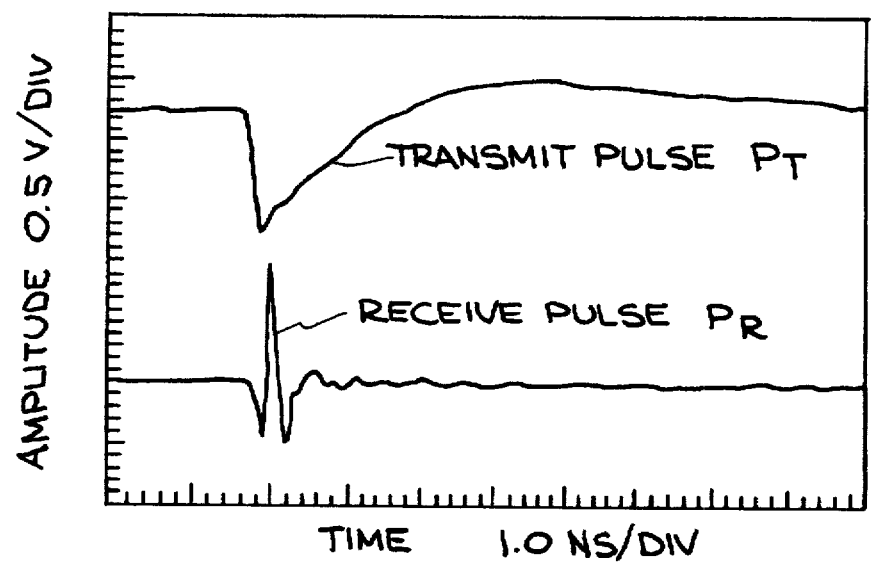
FIG. 5 is a plot of antenna response.

FIG. 5 shows the actual response pulse $P_R$ of two identical antennas beamed at each other in response to the step-like drive waveform $P_T$. The drive waveform has a 50 ps falltime, and the antenna output waveform is equivalent to one cycle of a 4 GHz sinusoid.

One true proof of UWB impulse radar antenna performance is to test the antenna on an actual short range radar system. Using the new antennas with a short range system, reflections from objects appear like $P_R$ in FIG. 5 and there is essentially no low frequency ringing, even with long coax feed lines. In contrast, other antennas fail to meet one or more requirements, usually simultaneously failing on ringing and pulse aberrations, sidelobe clutter, and low frequency feedline pickup.

As a simple test to prove out the new antennas, the transmit antenna is driven with $P_T$ in FIG. 5, and the receive antenna output $P_R$ is connected to a Tektronix S-4 sampling head. A 2×2 foot plate at 10 foot range yields a clean 10 mV pulse, which is readable on the Tektronix oscilloscope, and is essentially a solid full-scale response on an impulse radar employing the high sensitivity "Ultra-Wideband Receiver" of U.S. Pat. No. 5,345,471. The return signature in this simple "radar" configured with common lab equipment has a clean, clutter-free baseline that is directly useable for ranging and imaging applications without clutter-subtraction circuitry.

Changes and modifications in the specifically described embodiments can be carried out without departing from the scope of the invention which is intended to be limited only by the scope of the claims.

The invention claimed is:

1. An ultra-wideband antenna, comprising:
   a horn;
   a top-driven non-distributed radiator mounted in the horn, wherein the non-distributed radiator is a top-driven monopole radiator element comprising a feed plate and a launcher plate connected at one edge to the feed plated at an abrupt angle and at an opposed edge to an inside wall of the horn.

2. The antenna of claim 1 further comprising resistive damping elements connected to the monopole radiator element.

3. An ultra-wideband antenna, comprising:
   a horn having a narrower feedline end and a wider aperture end;
   a launcher plate mounted within the horn, recessed from the aperture end, having a first edge attached to an inside wall of the horn and a second edge opposed to the first edge;
   a tapered feed plate mounted in the horn, extending from the feedline end to the second edge of the launcher plate and being attached thereto to form an abrupt edge.

4. The antenna of claim 3 wherein the feed plate is connectable to a feedline at the feedline end of the horn.

5. The antenna of claim 4 wherein the feedline is a coaxial cable.

6. The antenna of claim 3 further comprising a fin mounted to the launcher plate and to the inside wall of the horn.

7. The antenna of claim 3 further comprising lips extending outward from the aperture end of the horn.

8. The antenna of claim 3 further comprising resistive damping elements connected to the launcher plate.

9. The antenna of claim 3 wherein the feed plate has an impedance which approaches a short circuit at low frequencies.

10. An ultra-wideband antenna, comprising:
    a horn having a narrower feedline end and a wider aperture end;
    a launcher plate mounted within the horn, recessed from and substantially facing the aperture end, having a first edge attached to an inside wall of the horn and a second edge opposed to the first edge;
    a tapered feed plate mounted in the horn, extending from the feedline end to the second edge of the launcher plate and being attached thereto to form an abrupt edge, the feed plate being connectable to a feedline at the feedline end of the horn;
    a fin mounted to the launcher plate and to the inside wall of the horn;
    lips extending outward from the aperture end of the horn;
    at least one resistive damping element connected to the launcher plate.

* * * * *